United States Patent
Gao et al.

(10) Patent No.: US 12,556,735 B2
(45) Date of Patent: Feb. 17, 2026

(54) LOCAL WARP MOTION DELTA MODE

(71) Applicant: TENCENT AMERICA LLC, Palo Alto, CA (US)

(72) Inventors: Han Gao, San Diego, CA (US); Xin Zhao, Palo Alto, CA (US); Liang Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 238 days.

(21) Appl. No.: 17/980,125

(22) Filed: Nov. 3, 2022

(65) Prior Publication Data
US 2024/0022756 A1 Jan. 18, 2024

Related U.S. Application Data

(60) Provisional application No. 63/388,886, filed on Jul. 13, 2022.

(51) Int. Cl.
*H04N 19/513* (2014.01)
*H04N 19/176* (2014.01)
*H04N 19/70* (2014.01)

(52) U.S. Cl.
CPC ......... *H04N 19/513* (2014.11); *H04N 19/176* (2014.11); *H04N 19/70* (2014.11)

(58) Field of Classification Search
CPC ..... H04N 19/513; H04N 19/176; H04N 19/70
See application file for complete search history.

(56) References Cited

U.S. PATENT DOCUMENTS

| | | | |
|---|---|---|---|
| 2006/0233448 A1 | 10/2006 | Pace et al. | |
| 2019/0028731 A1* | 1/2019 | Chuang | H04N 19/176 |
| 2021/0227207 A1* | 7/2021 | Zhang | H04N 19/184 |
| 2021/0321092 A1* | 10/2021 | Zhang | H04N 19/517 |
| 2022/0038713 A1 | 2/2022 | Li et al. | |
| 2022/0150506 A1* | 5/2022 | Luo | H04N 19/176 |
| 2022/0182614 A1* | 6/2022 | Jang | H04N 19/11 |
| 2022/0210462 A1* | 6/2022 | Luo | H04N 19/117 |
| 2022/0217328 A1 | 7/2022 | Zhang et al. | |

OTHER PUBLICATIONS

International Search Report issued Feb. 15, 2023 in Application No. PCT/US22/48910.
Written Opinion issued Feb. 15, 2023 in Application No. PCT/US22/48910.

* cited by examiner

*Primary Examiner* — Jeremiah C Hallenbeck-Huber
(74) *Attorney, Agent, or Firm* — Morgan, Lewis & Bockius LLP

(57) ABSTRACT

An approach for encoding/decoding video data, performed by at least one processor, may include: obtaining a coded video bitstream; obtaining a plurality of blocks from the video bitstream, wherein the plurality of blocks comprise a current block and one or more neighboring blocks; determining, based a syntax element in the video bitstream, that a warp delta mode is used to predict the current block; determining positions and motion vectors of the one or more neighboring blocks; generating a first warp model of the current block based on motion vectors of the one or more neighboring blocks; selecting a warp model from among the first warp model of the current block and a second warp model associated with one of the one or more neighboring blocks as a base model of a coding mode; and decoding the plurality of blocks in the coding mode based on the base model.

18 Claims, 14 Drawing Sheets

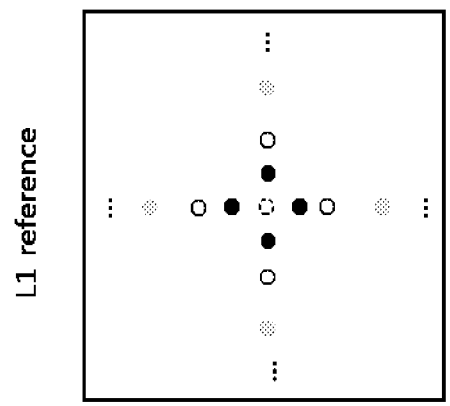
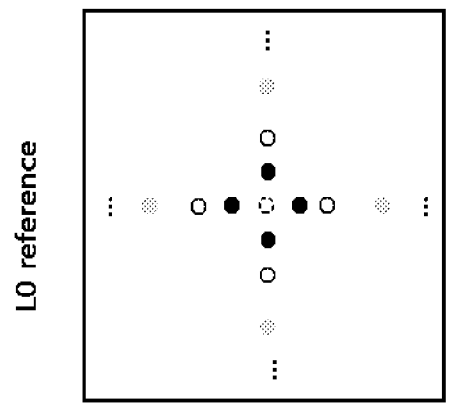
FIG. 5

LOCAL WARP MOTION DELTA MODE

CROSS-REFERENCE TO RELATED APPLICATION

This application is based on and claims priority to U.S. Provisional Patent Application No. 63/388,886, filed on Jul. 13, 2022, the disclosure of which is incorporated by reference herein in its entirety.

FIELD

The present disclosure relates generally to advanced image and video coding technologies and more particularly to encoding and/or decoding involving local warp motion modes.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019 a validated version 1.0.0 with Errata 1 of the specification was released. The AV1 bitstream specification includes a reference video codec.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). They have also explored the potential need for standardization of future video coding technology (which could significantly outperform HEVC in compression capability). In October 2017, they issued the Joint Call for Proposals on Video Compression with Capability beyond HEVC (CfP). By Feb. 15, 2018, a total of 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10$^{th}$ JVET (Joint Video Exploration Team or Joint Video Expert Team) meeting. As a result of this meeting, JVET formally launched the standardization of next-generation video coding beyond HEVC. The new standard was named Versatile Video Coding (VVC).

SUMMARY

Embodiments of the present disclosure relate to a video coding method, a device, and a computer-readable medium for improving on local warp motion delta modes.

According to an aspect of one or more embodiments, a video coding method, performed by at least one processor, may include: obtaining a coded video bitstream; obtaining a plurality of blocks from the video bitstream, wherein the plurality of blocks comprise a current block and one or more neighboring blocks; determining, based a syntax element in the video bitstream, that a warp delta mode is used to predict the current block; determining positions and motion vectors of the one or more neighboring blocks; generating a first warp model of the current block based on motion vectors of the one or more neighboring blocks; selecting a warp model from among the first warp model of the current block and a second warp model associated with one of the one or more neighboring blocks as a base model of a coding mode; and decoding the plurality of blocks in the coding mode based on the base model.

According to other aspects of one or more embodiments, a device/apparatus and non-transitory computer readable medium consistent with the video coding method are also provided.

Additional embodiments will be set forth in the description that follows and, in part, will be apparent from the description, and/or may be realized by practice of the presented embodiments of the disclosure.

BRIEF DESCRIPTION OF THE DRAWINGS

To describe the technical solutions of example embodiments of this disclosure more clearly, the following briefly introduces the accompanying drawings for describing the example embodiments. The accompanying drawings herein, which are incorporated into the specification and constitute a part of this specification, show embodiments that conform to this disclosure, and are used for describing a principle of this disclosure together with this specification. Apparently, the accompanying drawings in the following description show merely some embodiments. In addition, one of ordinary skill would understand that aspects of example embodiments may be combined together or implemented alone.

FIG. 5 illustrates an MMDV search point of two reference frames, according to some embodiments.

DETAILED DESCRIPTION

Figure 1:
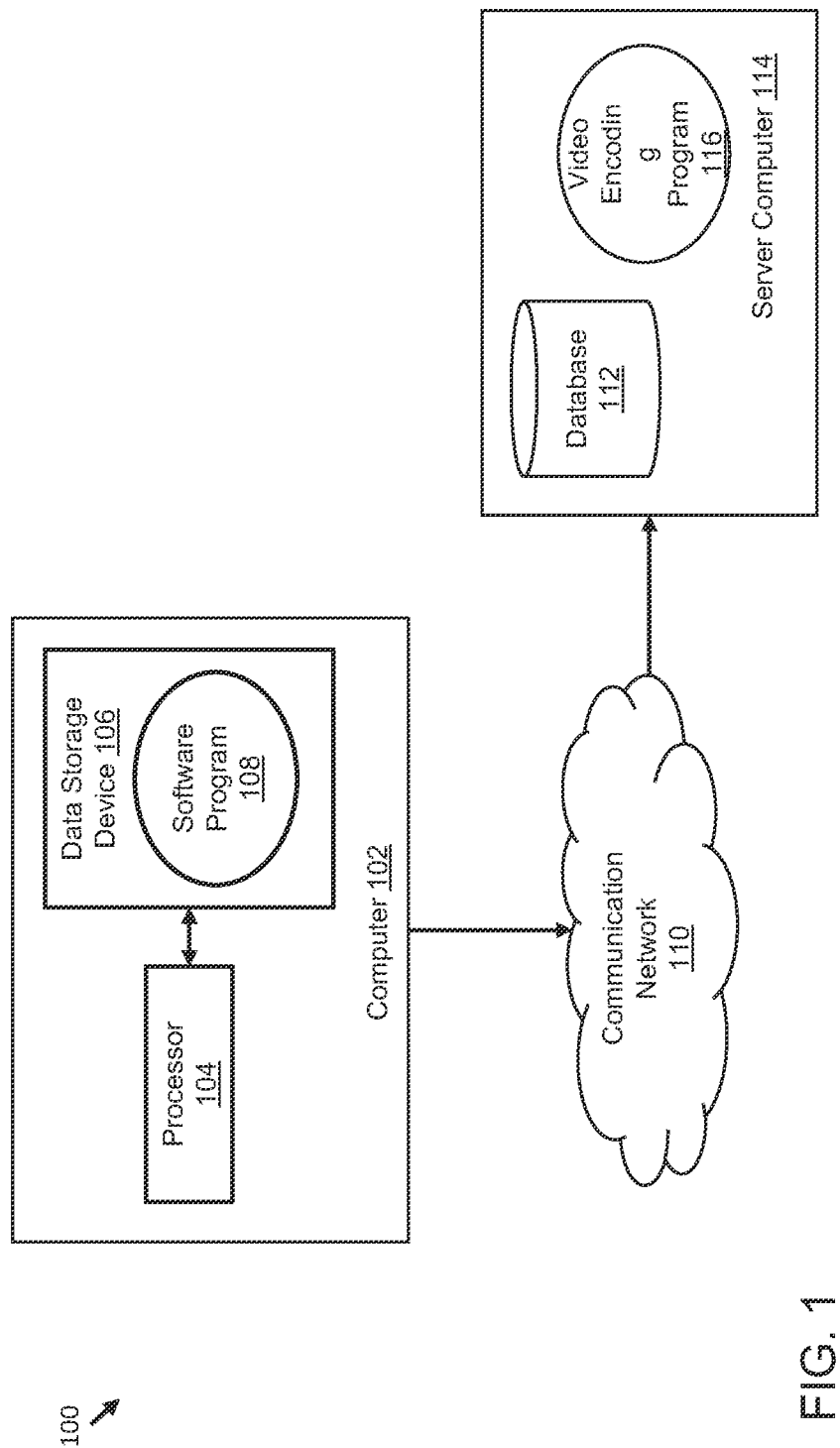
FIG. 1 illustrates a networked computer environment, according to some embodiments.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Referring now to FIG. 1, a functional block diagram of a networked computer environment illustrating a video coding system 100 (hereinafter "system") for encoding and/or decoding video data according to exemplary embodiments such as those described herein. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 10 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 11 and 12. The server computer 114 may also be located in a cloud computing deployment model, such as a private cloud, community cloud, public cloud, or hybrid cloud.

The server computer 114, which may be used for encoding video data is enabled to run a Video Encoding Program 116 (hereinafter "program") that may interact with a database 112. The Video Encoding Program method is explained in more detail below with respect to FIG. 4. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger video encoding program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2A:
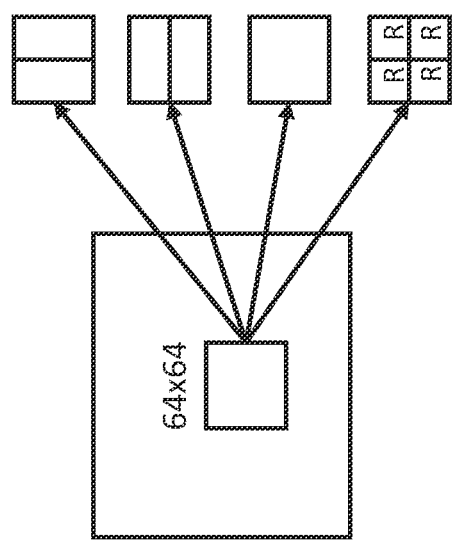
FIG. 2A illustrates a partition tree in VP9, according to some embodiments.
Figure 2B:
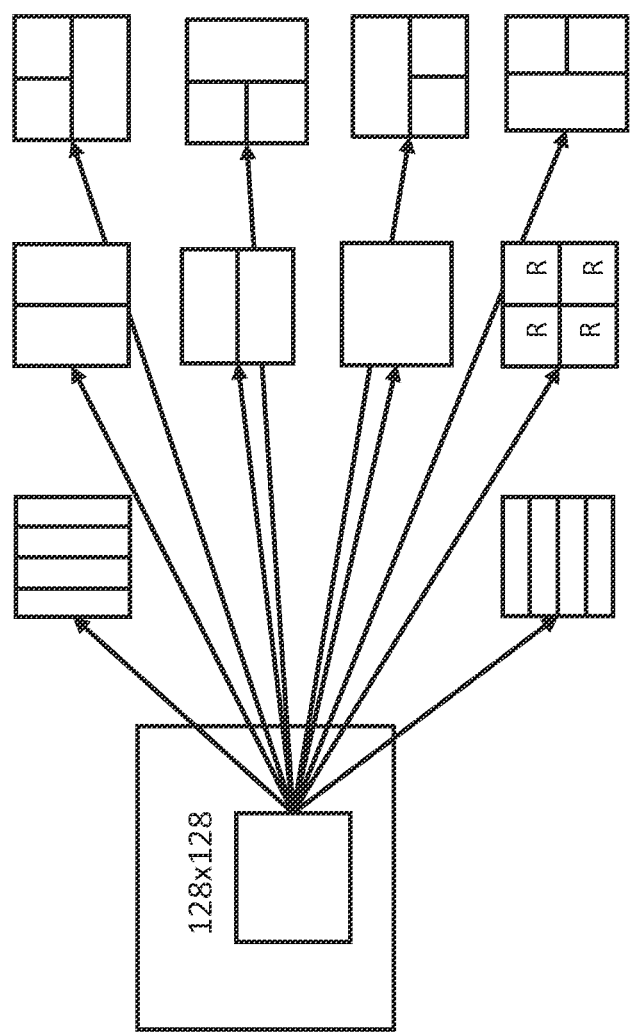
FIG. 2B illustrates a partition tree in AV1, according to some embodiments.

As previously described, AV1 is an open video coding format designed for video transmissions over the Internet developed as a successor to VP9. As shown in FIG. 2A, VP9 uses a 4-way partition tree starting from a 64×64 level down to a 4×4 level, with some additional restrictions for blocks 8×8 and below (as shown in the top half of FIG. 2A). Note that partitions designated as R may be referred to as recursive in that the same partition tree may be repeated at a lower scale until the partitions reach the lowest 4×4 level. As shown in FIG. 2B, AV1 not only expands the partition-tree to a 10-way structure, but also increases the largest size (referred to as superblock in VP9/AV1 parlance) to start from 128×128. Note that this may include 4:1/1:4 rectangular partitions that did not exist in VP9 (shown in FIG. 2A). None of the rectangular partitions can be further subdivided. In addition, AV1 adds more flexibility to the use of partitions below the 8×8 level, in the sense that 2×2 chroma inter prediction now becomes possible in certain cases.

In HEVC, a coding tree unit (CTU) may be split into coding units (CUs) by using a quad-tree (QT) structure denoted as coding tree to adapt to various local characteristics. The decision on whether to code a picture area using inter-picture (temporal) or intra-picture (spatial) prediction may be made at the CU level. Each CU can be further split into one, two or four prediction units (PUs) according to the PU splitting type. Inside one PU, the same prediction process may be applied, and the relevant information may be transmitted to the decoder on a PU basis. After obtaining the residual block by applying the prediction process based on the PU splitting type, a CU can be partitioned into transform units (TUs) according to another QT structure like the coding tree for the CU. One of the key features of the HEVC structure is that it has the multiple partition conceptions including CU, PU, and TU. In HEVC, a CU or a TU can only be square shape, while a PU may be square or rectangular shape for an inter predicted block. One coding block may be further split into four square sub-blocks, and a transformation performed on each sub-block (i.e., TU). Each TU may be further split recursively (using quad-tree split) into smaller TUs, which is called Residual Quad-Tree (RQT). At picture boundaries, HEVC employs implicit quad-tree split so that a block will keep quad-tree splitting until the size fits the picture boundary.

Figure 3B:
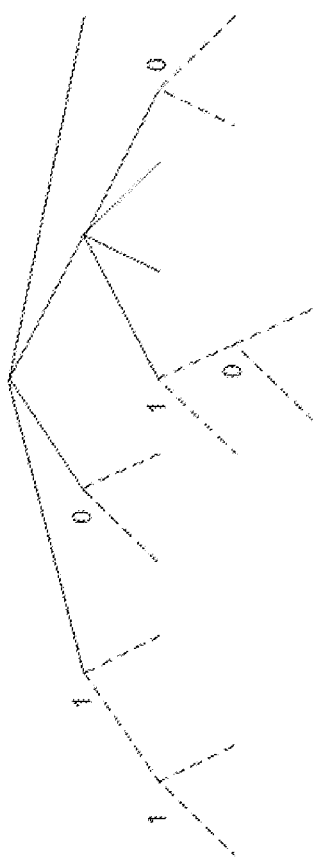
FIG. 3B illustrates a corresponding tree representation of the block partitioned QTBT structure shown in FIG. 3A.
Figure 3A:
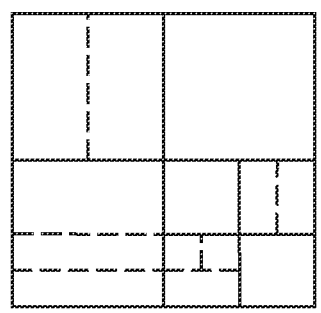
FIG. 3A illustrates block partitioning of a quad-tree plus binary tree (QTBT) structure, according to some embodiments.

As shown in FIG. 3A, the coding tree unit (CTU) is first partitioned by a QT structure and the QT leaf nodes are further partitioned by a binary tree (BT) structure, forming a quad-tree plus binary tree (QTBT) block structure. The QTBT block structure removes the concepts of multiple partition types. That is, the QTBT structure removes the separation of the CU, PU and TU concepts, and supports more flexibility for CU partition shapes. In the QTBT block structure, a CU may have a square or a rectangular shape. There are two splitting types, symmetric horizontal splitting and symmetric vertical splitting, in the BT splitting. The BT leaf nodes are the CUs, and that segmentation is used for prediction and transform processing without any further partitioning. This means that the CU, PU and TU have the same block size in a QTBT coding block structure. In the joint exploration model (JEM) used by JVET, a CU may consists of coding blocks (CBs) of different color components. For example, one CU may contain one luma CB and two chroma CBs in the case of prediction (P) and binary (B) slices of the 4:2:0 chroma format. A CU may also consist of a CB of a single component. For example, one CU contains only one luma CB or just two chroma CBs in the case of I slices.

In a QTBT partitioning scheme, parameters including, but not limited to, CTU size (i.e., the root node size of a QT, similar to the concept in HEVC), the minimum allowed QT leaf node size (i.e., MinQTSize), the maximum allowed BT root node size (i.e., MaxBTSize), the maximum allowed BT depth (i.e., MaxBTDepth), and the minimum allowed BT leaf node size (i.e., MinBTSize).

For example, a QTBT partitioning scheme may be as follows. The CTU size may be set to 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The QT partitioning may be applied to the CTU first to generate QT leaf nodes. The QT leaf nodes may have a size from 16×16 (i.e., the MinQTSize) to 128×128 (i.e., the CTU size). If the leaf QT node is 128×128, it will not be further split by the BT since the size exceeds the MaxBTSize (i.e., 64×64). In some embodiments, the leaf QT node may be further partitioned by the BT. Therefore, the QT leaf node is also the root node for the BT and has a BT depth of zero. When the BT depth reaches MaxBTDepth (i.e., 4), no further splitting is considered. When the BT node has a width equal to MinBTSize (i.e., 4), no further horizontal splitting is considered. Similarly, when the BT node has a height equal to MinBTSize, no further vertical splitting is considered. The leaf nodes of the BT are further processed by prediction and transform processing without any further partitioning. In the JEM, for example, the maximum CTU size is 256×256 luma samples.

FIG. 3A illustrates an example of block partitioning of a QTBT structure and FIG. 3B illustrates the corresponding tree representation. The solid lines indicate QT splitting and the dotted lines indicate BT splitting. In each splitting (i.e., non-leaf) node of the BT, one flag may be signalled to indicate which splitting type (i.e., horizontal or vertical) is used. For example, as shown in FIG. 3B, 0 indicates horizontal splitting and 1 indicates vertical splitting. For the QT splitting, there is no need to indicate the splitting type since QT splitting always splits a block both horizontally and vertically to produce 4 sub-blocks with equal size.

The QTBT partitioning scheme supports flexibility for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consist of a coding block of the luma component or coding blocks of two chroma components, and a CU in a P or B slice consist of coding blocks of all three color components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT as implemented in the JEM-7.0, these restrictions are removed.

Figure 4:
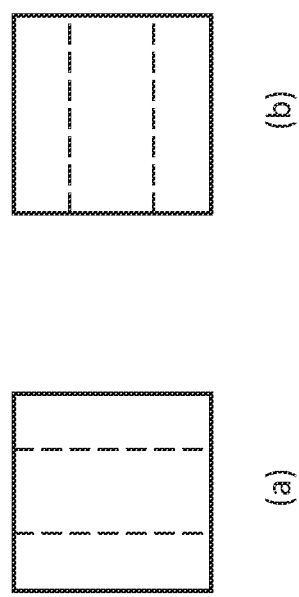
FIG. 4 illustrates a multi-type-tree (MTT) structure, according to some embodiments.

FIG. 4 illustrates a multi-type-tree (MTT) structure, in VCC, which further adds (a) vertical center-side triple-tree partitioning and (b) horizontal center-side triple-tree partitioning on top of the QTBT. Benefits of the triple-tree partitioning shown in FIG. 4 include, but are not limited to: complementing the quad-tree and binary-tree partitioning, triple-tree partitioning is able to capture objects which are located in the block center while the quad-tree and binary-tree are always splitting along the block center; and the width and height of the partitions of the proposed triple trees are always a power of 2, as such no additional transforms are needed. The two-level tree design is mainly motivated by complexity reduction. Theoretically, the complexity of traversing a tree is $T^D$, where T denotes the number of split types, and D is the depth of tree.

In merge mode, implicitly derived motion information is directly used for prediction sample generation of a current CU. The merge mode with motion vector differences (MMVD) is introduced in VVC. A MMVD flag is signalled right after sending a skip flag and merge flag to specify whether MMVD mode is used for the CU. In MMVD, after a merge candidate is selected, it may be further refined by the signalled MVDs information. The MVDs information may include a merge candidate flag, an index to specify motion magnitude, and an index for indication of motion direction. In merge mode, one for the first two merge candidate flags in the merge list is selected to be used as MV basis. The merge candidate flag is signalled to specify which flag is used.

A distance index specifies the motion magnitude information and indicates a pre-defined offset from the starting point. FIG. 5 illustrates an MMDV search point of two reference frames, according to some embodiments. As shown in FIG. 5, an offset may be added to either horizontal components or vertical components of a starting MV. The relation between the distance index and the pre-defined offset is specified in Table 1 below.

TABLE 1

Relation of Distance Index and Pre-defined Offset

| | Distance IDX | | | | | | | |
|---|---|---|---|---|---|---|---|---|
| | 0 | 1 | 2 | 3 | 4 | 5 | 6 | 7 |
| Offset (in unit of luma sample) | ¼ | ½ | 1 | 2 | 4 | 8 | 16 | 32 |

The direction index represents the direction of the MVD relative to the starting point. The direction index may represent one of the four directions, as shown in Table 2 below. It's noted that the meaning of the MVD sign may be variant according to the information of the starting MVs. When the starting MVs are uni-prediction MVs or bi-prediction MVs with both lists pointing to the same side of a current picture (i.e., POCs of two references are both larger than the POC of the current picture, or the POCs of the two references are both smaller than the POC of the current picture), the sign in Table 2 specifies the sign of MV offset added to the starting MV. When the starting MVs are bi-prediction MVs with the two MVs pointing to the different sides of the current picture (i.e., the POC of one reference is larger than the POC of the current picture, and the POC of the other reference is smaller than the POC of the current picture), and the difference of the POC in list 0 (L0) is greater than the one in list 1 (L1), the sign in Table. 2 specifies the sign of MV offset added to the L0 MV component of the starting MV and the sign for the L1 MV has the opposite value. If the difference of the POC in L1 is greater than L0, the sign in Table. 2 specifies the sign of the MV offset added to the L1 MV component of the starting MV and the sign for the L0 MV has the opposite value.

The MVD is scaled according to the difference of POCs in each direction. If the differences of POCs in both lists are the same, no scaling is needed. If the difference of POC in L0 is larger than the one of L1, the MVD for L1 is scaled. If the POC difference of L1 is greater than L0, the MVD for L0 is scaled in the same way. If the starting MV is uni-predicted, the MVD is added to the available MV.

TABLE 2

Sign of MV Offset Specified by Direction Index

| Direction IDX | 00 | 01 | 10 | 11 |
|---|---|---|---|---|
| x-axis | + | − | N/A | N/A |
| y-axis | N/A | N/A | + | − |

In VVC, besides the normal unidirectional prediction and bi-directional prediction mode MVD signalling, symmetric MVD mode for bi-directional MVD signalling may be applied. In the symmetric MVD mode, motion information including reference picture indices of both L0 and L1 and MVD of L1 may be derived (not signaled).

The decoding process of the symmetric MVD mode is as follows. First, at the slice level, variables BiDirPredFlag, RefIdxSymL0 and RefIdxSymL1 are derived. For example, if the mvd_l1_zero_flag is 1, then BiDirPredFlag is set equal to 0. If the nearest reference picture in L0 and the nearest reference picture in L1 form a forward and backward pair of reference pictures or a backward and forward pair of reference pictures, then BiDirPredFlag is set to 1, and both L0 and L1 reference pictures are short-term reference pictures. Otherwise, BiDirPredFlag is set to 0. Second, at the CU level, a symmetrical mode flag indicating whether symmetrical mode is used or not is explicitly signaled if the CU is bi-prediction coded and BiDirPredFlag is equal to 1. When the symmetrical mode flag is true (e.g., equal to 1), only mvp_l0_flag, mvp_l1_flag, and MVD0 are explicitly signaled. The reference indices for L0 and L1 are set equal to the pair of reference pictures, respectively. Lastly, MVD1 is set equal to (−MVD0).

In AV1, for each coded block in an inter frame, if the mode of the current block is not skip mode but inter-coded mode, then another flag is signaled to indicate whether single reference mode or compound reference mode is used for the current block. A prediction block may be generated by one motion vector in single reference mode. In compound reference mode, the prediction block is generated by a weighted averaging of two prediction blocks derived from two motion vectors. Modes that may be signaled for a single reference case are detailed in Table 3 below.

TABLE 3

Modes Signaled in Single Reference Case

| Modes | Description |
|---|---|
| NEARMV | use one of the MVPs in the list indicated by a Dynamic Reference List (DRL) index. |
| NEWMV | use one of the MVPs in the list signaled by a DRL index as reference and apply a delta to the MVP. |
| GLOBALMV | use a motion vector based on frame-level global motion parameters. |

Modes that may be signaled for a compound reference case are detailed in Table 4 below.

TABLE 4

Modes Signaled in Compound Reference Case

| Modes | Description |
|---|---|
| NEAR_NEARMV | use one of the MVPs in the list signaled by a DRL index. |
| NEAR_NEWMV | use one of the MVPs in the list signaled by a DRL index as reference and send a delta MV for the second MV. |
| NEW_NEARMV | use one of the MVPs in the list signaled by a DRL index as reference and send a delta MV for the first MV. |
| NEW_NEWMV | use one of the MVPs in the list signaled by a DRL index as reference and send a delta MV for both MVs |
| GLOBAL_GLOBALMV | use MVs from each reference based on their frame-level global motion parameters. |

AV1 allows ⅛ pixel motion vector precision (or accuracy). Syntaxes may be used to signal the motion vector difference in reference frame L0 or L1 as follows. Syntax mv_joint specifies which components of the motion vector difference are non-zero. Syntax mv_joint value of 0 indicates there is no non-zero MVD along either horizontal or vertical direction, value of 1 indicates there is non-zero MVD only along horizontal direction, value of 2 indicates there is non-zero MVD only along vertical direction, and value of 3 indicates there is non-zero MVD along both horizontal and vertical direction. Syntax mv_sign specifies whether a motion vector difference is positive or negative. Syntax mv_class specifies the class of the motion vector difference. As shown in Table 5 below, a higher class means that the motion vector difference has a larger magnitude. Syntax Hhmv_bit specifies the integer part of the offset between the motion vector difference and a starting magnitude of each MV class. Syntax mv_fr specifies the first two fractional bits of the motion vector difference. Syntax mv_hp specifies the third fractional bit of the motion vector difference.

TABLE 5

Magnitude Class for Motion Vector Difference

| MV class | Magnitude of MVD |
|---|---|
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] |

For NEW_NEARMV and NEAR_NEWMV modes (shown in Table 4), the precision of the MVD depends on the associated class and the magnitude of MVD. Firstly, fractional MVD is allowed only if MVD magnitude is equal to or less than one-pixel. Secondly, only one MVD value is allowed when the value of the associated MV class is equal to or greater than MV_CLASS_1, and the MVD value in each MV class is derived as 4, 8, 16, 32, 64 for MV class 1 (MV_CLASS_1), 2 (MV_CLASS_2), 3 (MV_CLASS_3), 4 (MV_CLASS_4), or 5 (MV_CLASS_5). The allowed MVD values in each MV class are shown in Table 6.

TABLE 6

Adaptive MVD in Each MV Magnitude Class

| MV class | Magnitude of MVD |
|---|---|
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {1024} |
| MV_CLASS_10 | {2048} |

In some embodiments, if the current block is coded using NEW_NEARMV or NEAR_NEWMV mode, one context is used for signaling mv_joint or mv_class. If the current block is not coded using NEW_NEARMV or NEAR_NEWMV mode, another context is used for signaling mv_joint or mv_class.

A new inter coded mode (i.e., JOINT_NEWMV) may be applied to indicate whether the MVDs for two reference lists are jointly signaled. If the inter prediction mode is equal to JOINT_NEWMV mode, the MVDs for reference L0 and reference L1 are jointly signaled. As such, only one MVD, named as joint_mvd, may be signaled and transmitted to a decoder, and delta MVs for reference L0 and reference L1 may be derived from joint_mvd. JOINT_NEWMV mode is signaled together with NEAR_NEARMV, NEAR_NEWMV, NEW_NEARMV, NEW_NEWMV, and GLOBAL_GLOBALMV mode. No additional contexts may be added.

When JOINT_NEWMV mode is signaled, and the POC distance between two reference frames and a current frame are different, MVD is scaled for reference L0 or reference L1 based on the POC distance. To be specific, the distance between reference frame L0 and the current frame is noted as td0 and the distance between reference frame L1 and the current frame is noted as td1. If td0 is equal to or larger than td1, then joint_mvd is directly used for reference L0 and the mvd for reference L1 is derived from joint_mvd based on the following Equation (1).

$$\text{derived\_mvd} = \frac{td1}{td0} * \text{joint\_mvd} \quad \text{Equation (1)}$$

If td1 equal to or larger than td0, then joint_mvd is directly used for reference L1 and the mvd for reference L0 is derived from joint_mvd based on the following Equation (2).

$$\text{derived\_mvd} = \frac{td0}{td1} * \text{joint\_mvd} \quad \text{Equation (2)}$$

A new inter coded mode (i.e., AMVDMV) may be added to single reference case. When AMVDMV mode is selected, it indicates that AMVD is applied to the signal MVD. A flag, for example, amvd_flag may be added under JOINT_NEWMV mode to indicate whether AMVD is applied to joint MVD coding mode or not. When adaptive MVD resolution is applied to joint MVD coding mode, named as joint AMVD coding, MVD for two reference frames are jointly signaled and the precision of MVD is implicitly determined by MVD magnitudes. MVD for two (or more than two) reference frames are jointly signaled, and MVD coding is applied.

In adaptive motion vector resolution (AMVR), initially proposed in CWG-C012, a total of seven MV precisions (8, 4, 2, 1, ½, ¼, ⅛) are supported. For each prediction block, AVM encoder searches all the supported precision values and signals the best precision to the decoder. To reduce the encoder run-time, two precision sets are supported. Each precision set contains 4-predefined precisions. The precision set is adaptively selected at the frame level based on the value of maximum precision of the frame. Similar to AV1, the maximum precision is signaled in the frame header. Table 7 summarizes the supported precision values based on the frame level maximum precision.

TABLE 7

Supported MV precisions in Two Sets

| Frame level maximum precision | Supported MV precisions |
|---|---|
| ⅛ | ⅛, ½, 1, 4 |
| ¼ | ¼, 1, 4, 8 |

In AVM software (similar to AV1), there is a frame level flag to indicate if the MVs of the frame contain sub-pel precisions or not. The AMVR is enabled only if the value of cur_frame_force_integer_mv flag is 0. In the AMVR, if precision of the block is lower than the maximum precision, motion model and interpolation filters are not signaled. If the precision of a block is lower than the maximum precision, motion mode is inferred to translation motion and an interpolation filter is inferred to a REGULAR interpolation filter. Similarly, if the precision of the block is either 4-pel or 8-pel, inter-intra mode is not signaled and inferred to be 0.

Motion compensation typically assumes a translational motion model between the reference and target block. However, warped motion utilizes an affine model. The affine motion model may be represented by Equation (3).

$$\begin{bmatrix} x' \\ y' \end{bmatrix} = \begin{bmatrix} a_1 & a_2 & a_3 \\ b_1 & b_2 & b_3 \end{bmatrix} \cdot \begin{bmatrix} x \\ y \\ 1 \end{bmatrix} \quad \text{Equation (3)}$$

where [x, y] are coordinates of the original pixel and [x', y'] are the warped coordinates of the reference block. According to Equation (3), up to six parameters are needed to specify the warped motion: $a_3$ and $b_3$ specify a translational MV; $a_1$ and $b_2$ specify the scaling along the MV; and $a_2$ and $b_1$ specify the rotation.

In global warped motion compensation, global motion information is signaled for each inter reference frame, which includes a global motion type and several motion parameters. The global motion types and numbers of associated parameters are listed in Table 9.

TABLE 9

Global Motion Types with Associated Number of Parameters

| Global motion type | Number of parameters |
|---|---|
| Identity (zero motion) | 0 |
| Translational | 2 |
| Rotational | 4 |
| Zoom | 4 |
| General affine | 6 |

After signaling the reference frame index, if global motion is selected, the global motion type and the parameters associated with the given reference frame are used for the current coding block.

In local warped motion compensation, local warped motion is allowed for an inter coding block when the following conditions are met. First, the current block must use a single reference prediction. The width or height of the coding block must be greater than or equal to eight. Finally, at least one of the adjacent neighbouring blocks must use the same reference frame as the current block.

If local warped motion is used for the current block, the affine model parameters are estimated by mean-squared minimization of the difference between the reference and modeled projections based on the MVs of the current block and its adjacent neighboring blocks. To estimate the parameters of local warped motion, if the neighboring block uses the same reference frame as the current block, a projection sample pair of the center sample in the neighboring block and its corresponding sample in the reference frame are obtained. Subsequently, three extra samples are created by shifting the center position by a quarter sample in one or both dimensions. These extra samples may also be considered as projection sample pairs to ensure the stability of a model parameter estimation process.

The MVs of neighboring blocks, which are used to derive the motion parameters, are referred to as motion samples. The motion samples are selected from neighboring blocks that use the same reference frame as the current block. Note that the warped motion prediction mode is only enabled for blocks that use a single reference frame.

Figure 6:
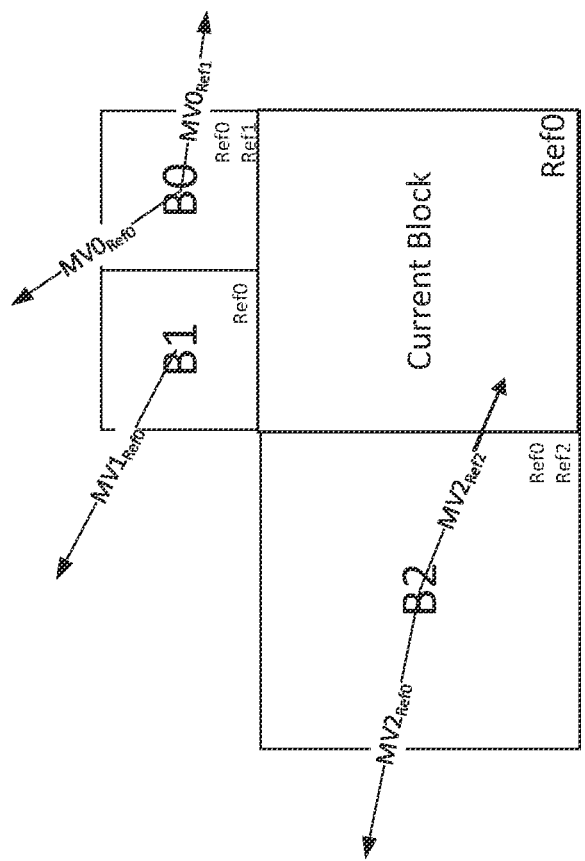
FIG. 6 illustrates exemplary motions samples used for deriving model parameters of a block using local warped motion predictions, according to some embodiments.

FIG. 6 illustrates exemplary motions samples used for deriving model parameters of a block using local warped motion predictions, according to some embodiments. As shown in FIG. 6, the MVs of neighboring blocks B0, B1, and B2 are referred as MV0, MV1, and MV2, respectively. The current block is predicted using uni-prediction with reference frame Ref0. The neighboring block B0 is predicted using compound prediction with reference frames Ref0 and Ref1. The neighboring block B1 is predicted using uni-prediction with reference frame Ref0. The neighboring block B2 is predicted using compound prediction with reference frames Ref0 and Ref2. The motion vector $MV0_{Ref0}$ of B0, $MV1_{Ref0}$ of B1 and $MV2_{Ref0}$ of B2 may be used as the motion samples for deriving the affine motion parameters of the current block.

In addition to translational motion, AVM also supports warped motion compensation. Two types of warped motion models are supported: a global warp model and a local warp model. The global warp model which is associated with each reference frame, where each of the four non-translational parameters has 12-bit precision and the translational motion vector is coded in 15-bit precision. A coding block may choose to use it directly (provided the reference frame index). The global warp model captures the frame level scaling and rotation. As such, the global warp model primarily focuses on rigid motion over the entire frame. The local warp model at coding block level is also supported. In a local warp mode, also known as WARPED_CAUSAL, the warp parameters of the current block are derived by fitting a model to nearby motion vectors using least-squares.

Figure 7:
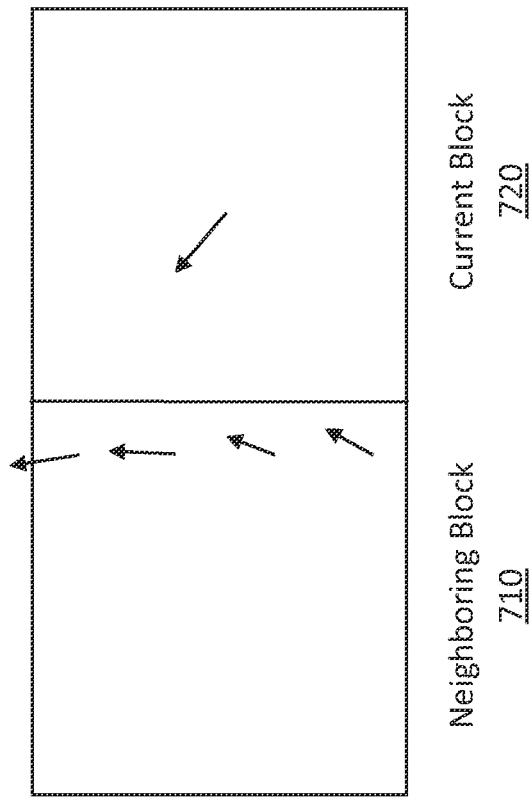
FIG. 7 illustrates motion vectors in blocks using a warp extend mode, according to some embodiments.

A new warped motion mode is called WARP_EXTEND. In WARP_EXTEND mode, the motion of a neighboring block is smoothly extended into the current block, but with some ability to modify the warp parameters. This allows complex warping motions to be represented, spread across multiple blocks, while minimizing blocking artifacts. To accomplish this, the WARP_EXTEND mode, applied to NEWMV block, builds a new warp model based on two constraints: the per-pixel motion vectors generated by the new warp model should be continuous with the per-pixel motion vectors in a neighboring block, and the pixel at the center of the current block should have a per-pixel motion vector which matches the signaled motion vector for the block as a whole. FIG. 7 illustrates motion vectors in blocks using a warp extend mode, according to some embodiments. As shown in FIG. 7, for example, if the neighboring block 710 at the left of the current block 720 is warped, then a model which fits the motion vectors illustrated in FIG. 7 is used as the warp model.

The two constraints for building the new warp model imply certain equations involving the warp parameters of the neighboring block and the current block. These equations may then be solved to calculate the warp model for the current block. For example, if (A, . . . , F) represents the neighbor's warp model and (A', . . . , F') represents the new warp model, then the first constraint is as follows, at each point along the common edge:

$$\begin{pmatrix} A' & B' \\ C' & D' \end{pmatrix}\begin{pmatrix} x \\ y \end{pmatrix} + \begin{pmatrix} E\prime \\ F\prime \end{pmatrix} = \begin{pmatrix} A & B \\ C & D \end{pmatrix}\begin{pmatrix} x \\ y \end{pmatrix} + \begin{pmatrix} E \\ F \end{pmatrix} \qquad \text{Equation (4)}$$

Note that the points along the edge have different values of y, but they all have the same value of x. This means that the coefficients of y must be the same on both sides (i.e., B'=B and D'=D). Meanwhile, the x coefficients provide two equations relating the other coefficients, defined by equations (5)-(8) below:

$$B'=B \qquad \text{Equation (5)}$$

$$D'=D \qquad \text{Equation (6)}$$

$$A'x+E'=Ax+E \qquad \text{Equation (7)}$$

$$C'x+F'=Cx+F \qquad \text{Equation (8)}$$

where, in equations (7)-(8), x is the horizontal position of the vertical column of pixels, so is effectively a constant.

The second constraint specifies that the motion vector at the center of the block must equal the one signaled using the NEWMV mechanism. This provides two further equations, resulting in a system of six equations in six variables which has a unique solution. These equations may be solved efficiently, both in software and in hardware. The solution may be solved using basic addition, subtraction, multiplication, and divisions by powers of 2. As such, this mode is significantly less complex than the least-squares based local warp mode.

Note that there may be multiple neighboring blocks which may extend from. Therefore, there needs to be some way to choose which block to extend from. This problem is similarly encountered in motion vector prediction. Specifically, there may be several possible motion vectors from nearby blocks, and one to use as must be selected as the base for NEWMV coding. The solution for this may be extend to handle the needs of WARP_EXTEND. This is done by tracking the source of each motion vector prediction. Then, WARP_EXTEND is only enabled if the selected motion vector prediction was taken from a directly neighboring block. Then, that block is used as the single "neighboring block" in the rest of the algorithm.

Note that sometimes the neighbor's warp model will be very good as-is, without needing any further modification. To make this case cheaper to code, WARP_EXTEND may be used for NEARMV blocks. The neighbor selection is the same as for NEWMV, except that the selection in NEWMV requires the neighbor be warped (not just translated via the translational motion). But if this is true, and WARP_EXTEND is selected, then the neighbor's warp model parameters are copied to the current block.

In some embodiments, a motion mode is called WARP_DELTA may be used. In this mode, the block's warp model is coded as a delta from a predicted warp model, similar to how motion vectors are coded as a delta from a predicted motion vector. The prediction may be sourced from either the global motion model (if any), or a neighboring block.

To avoid having multiple ways to encode the same predicted warp model, restrictions may be applied. For example, if the mode is NEARMV or NEWMV, then the same neighbor selection logic as described for WARP_EXTEND is used. If this results in a neighboring block which is warped, then that neighboring block's model (without applying the rest of the WARP_EXTEND logic) is used as the prediction. Otherwise, the global warp model is used as a base. Other restrictions may be applied. This example is not intended to limit the scope of embodiments. Then, a delta for each of the non-translational parameters may be coded. Finally, the translational part of the model is adjusted so that the per-pixel motion vector at the center of the block matches the block's overall motion vector.

As this tool (i.e., WARP_DELTA) involves explicitly coding a delta per warp parameter, it uses more bits to encode than the other warp modes. As such, WARP_DELTA may be disabled for blocks smaller than 16×16. However, the decode logic is extremely simple, and as such may represent more complex motion that the other warp modes cannot.

Figure 8:
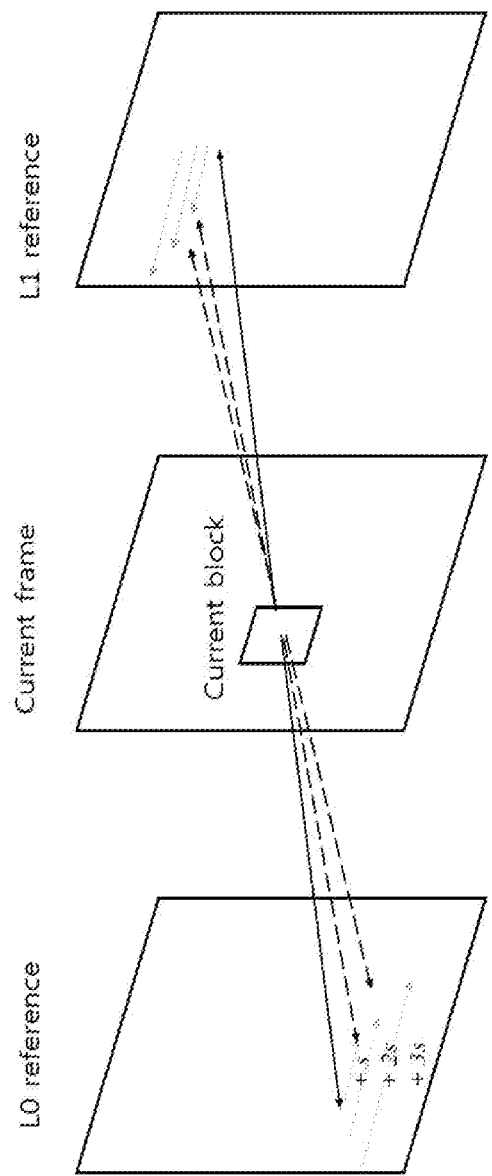
FIG. 8 illustrates an MMDV search process of a current frame using the two reference frames shown in FIG. 5, according to some embodiments.

A merge with Motion Vector Difference (MMVD) may be used for either skip or merge modes with a motion vector expression method. MMVD re-uses merge candidates in VVC. Among the merge candidates, a candidate may be selected, and further expanded by the proposed motion vector expression method. MMVD provides a new motion vector expression with simplified signaling. The expression method includes starting point, motion magnitude, and motion direction. MMVD techniques use a merge candidate list in VVC. But only candidates which have a default merge type (MRG_TYPE_DEFAULT_N) are considered for MMVD's expansion. FIG. 8 illustrates an MMDV search process of a current frame using, e.g., the two reference frames shown in FIG. 5. A base candidate index defines the starting point of the motion vector expression method. The base candidate index indicates the best candidate among candidates in the list as follows in Table 10.

TABLE 10

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of the base candidate is equal to 1, the base candidate IDX is not signaled. A distance index represents the motion magnitude information. The distance index indicates the pre-defined distance from the starting point information. The pre-defined distance may be as follows in Table 11.

TABLE 11

| | Distance IDX | | | | | | | |
|---|---|---|---|---|---|---|---|---|
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

A direction index represents the direction of the MVD relative to the starting point. The direction index may represent the four directions as shown in Table 12.

TABLE 12

| | Direction IDX | | | |
|---|---|---|---|---|
| Direction IDX | 00 | 01 | 10 | 11 |
| x-axis | + | − | N/A | N/A |
| y-axis | N/A | N/A | + | − |

An MMVD flag may be signaled right after sending a skip flag and a merge flag. If skip and merge flag is true, the MMVD flag is parsed. If MMVD flag is equal to 1, the MMVD syntaxes are parsed. But, if not 1, an AFFINE flag is parsed. If the AFFINE flag is equal to 1, that is AFFINE mode. If the AFFINE flag is not equal to 1, then the skip/merge index is parsed for the skip/merge mode in a reference software (e.g., VTM).

In the design of the local warp extend mode and the local warp delta mode (e.g., according to CWG-C050), the base warp model for warp delta mode is only allowed to be merged from one spatial neighboring block, which is pointed by the MV prediction index (i.e., MVP index). If this neighboring block does not use local warp mode, the global warp model is used as the base mode of the warp delta mode. However, this is suboptimal, because a better base warp model selection will lead to a smaller warp delta that saves signaling cost, as well increase the quality coded blocks.

In some embodiments, a warp model of the current block may be derived using a regression method based on the positions and MVs of neighboring blocks. This warp model may be used as the base of the warp delta mode. In some embodiments, instead of the neighboring block warp model, the current block warp model is always used as the base model if a warp model is used. If warp delta mode is used, a flag may be signaled to indicate whether the current block warp model or neighboring block warp model is used as the base model of the warp delta mode. If warp delta model is used, and the neighboring block pointed by the MVP index is not using local warp, then the current block warp model may be used instead of global warp model. If the current block does not have a warp model, a constructed 2-parameter translational warp model using the MV of the current block may be used as the base model of the warp delta mode. In some embodiments, when using the warp model of current block as the base of the warp delta mode, the range of the delta value may be different with that of using the warped model of neighboring blocks as the base. For example, when using the warp model of the current block as base warp model, the range of delta value is smaller with that of using the warped model of neighboring blocks as base model.

In some embodiments, one or multiple warp models from other MVP neighboring blocks (including spatial neighbor and temporal neighbor) may be used as the base of the warp delta mode.

In some embodiments, a fixed position neighboring block warp model may be used as the base. For example, a neighboring block warp model from the top, a neighboring block warp model from the left, a neighboring block warp model from the top-left corner, etc., may be used as the base.

In some embodiments, multiple neighboring block warp models may be checked in a pre-defined order via a pruning process. For example, the first warp model of neighboring block in the scanning order that uses a local warp model may be used as the base model of warp delta mode. As another example, if warp delta mode is used, and if the neighboring block pointed by the MVP index is not using local warp, the other (pre-defined) neighboring block warp model (instead of the global warp model) may be used. In another example, if the MVP index pointed to the top neighboring block that does not use local warp, the warp model of the left neighboring block may be used as the base. In another example, if the MVP index pointed to the left neighboring block that does not use local warp, the warp model of the top neighboring block may be used as the base. In another example, if both the top and the left neighboring blocks do not use local warp mode, the global warp model or current block warp model may be used.

In some embodiments, additional flag/indices may be signaled to indicate which warp models from which neighboring block is used. When there are multiple warp models from neighboring blocks, the average (or median value, or most frequently value) of all or selected warp models from neighboring blocks may be used as the base of warp delta mode. In one example, when there are multiple warp models from neighboring blocks, the warp model parameters extrapolated from the warp model parameters used in neighboring blocks may be used as the base of warp delta mode.

In some embodiments, depending on whether the MV is coded using NEAR or NEW mode, different base warp models may be used. For example, if the current MV is coded using NEARMV, the neighboring block as SOTA is used as the base model. If the current MV is coded using NEW mode, the projected model from the MVP pointed neighboring block may be used as the base model. The projection method may be the same as the method described with reference to the warp extend mode.

In some embodiments, the warp models of already coded blocks may be stored in a bank, storage component, or the like. One of the bank (or stored) entries may be used as the base of the warp delta mode. In one example, the bank warp model candidate may using the aspects of some embodiments to replace the neighboring block models. In some embodiments, the bank warp model may be indicated by a signaled index. In some embodiments, to reduce the memory bandwidth, stored model precision in the bank may be lower than the regular warp model, which is shifted back to the regular precision (bit depth) when used as the base model. There may be multiple banks depending on the number of model parameters of the warp motion. For example, separate banks may be used for storing 2, 4, and/or 6 warp motion model parameters. In some embodiments, there is a single bank storing warp motion model parameters, and this bank is updated after every coding block if it is inter coded. In some embodiments, the bank may only be updated conditionally depending on the prediction mode of the current coding block. For example, the bank is only updated when the current block is coded by the warp motion mode.

In some embodiments, the warp delta mode may be used as an extension mode of the warp mode (here after "regular warp mode"), and the warp extend mode, instead of a separated mode parallel to the regular warp mode and warp extend mode. That is, if the regular warp is used, a flag may be signaled to decide whether the warp delta is additionally signaled on top of the current block warp model. If this warp delta flag indicates true, the warp delta is signaled. If this warp delta flag indicates false, the current block warp model is used. In some embodiments, if the warp extend mode is used, a flag can be signaled to decide whether warp delta is additionally signaled on top of the warp extend model. If this warp delta flag indicates true, the delta is signaled. If this warp delta flag indicates false, the warp extend model is used.

The range/precision/step size of delta values for the parameters in warp delta mode may be different when applying it to the regular warp mode and the warp extend mode.

Figure 9:
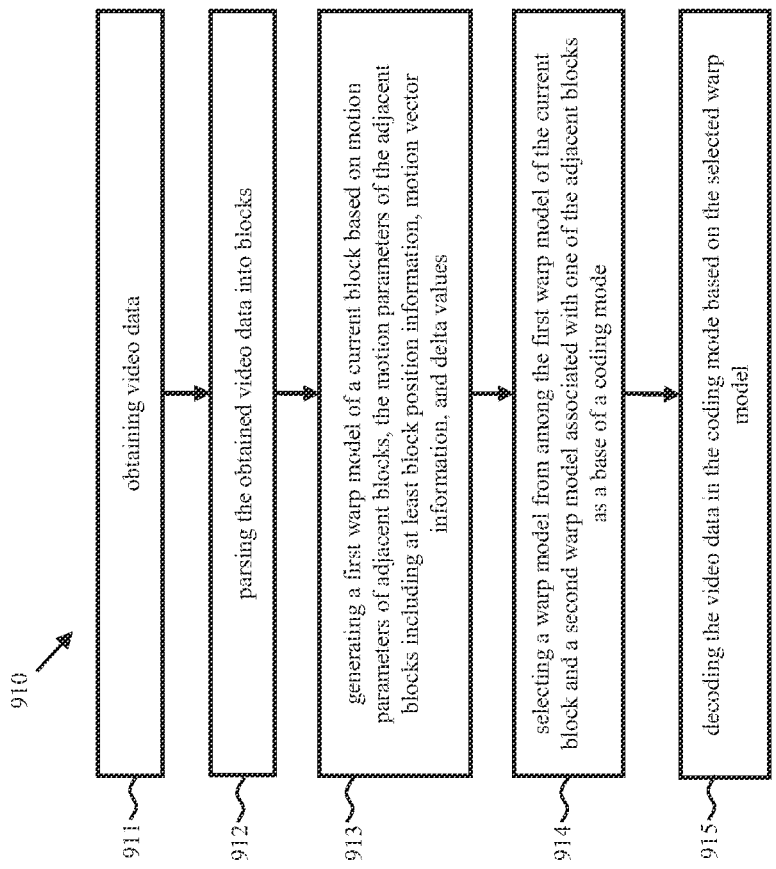
FIG. 9 is a flowchart illustrating a method for video coding, according to embodiments.

FIG. 9 is a flowchart illustrating a method 910 for video coding, performed by at least one processing, according to embodiments.

In some implementations, one or more process blocks of FIG. 9 may be performed by the computer 102. In some implementations, one or more process blocks of FIG. 9 may be performed by another device or a group of devices separate from or included in the computing environment 600.

As shown in FIG. 9, at operation 911 the method 910 may include obtaining video data.

At operation 912 the method 910 may include parsing the obtained video data into blocks.

At operation 913 the method 910 may include generating a first warp model of a current block based on motion parameters of adjacent blocks, the motion parameters of the adjacent blocks including at least block position information, motion vector information, and delta values.

At operation 914 the method 910 may include selecting a warp model from among the first warp model of the current block and a second warp model associated with one of the adjacent blocks as a base of a coding mode.

At operation 915 the method 910 may include decoding the video data in the coding mode based on the selected warp model.

Although FIG. 9 shows example blocks of the method, in some implementations, the method may include additional blocks, fewer blocks, different blocks, or differently arranged blocks than those depicted in FIG. 9. Additionally, or alternatively, two or more of the blocks of the method may be performed in parallel.

Figure 10:
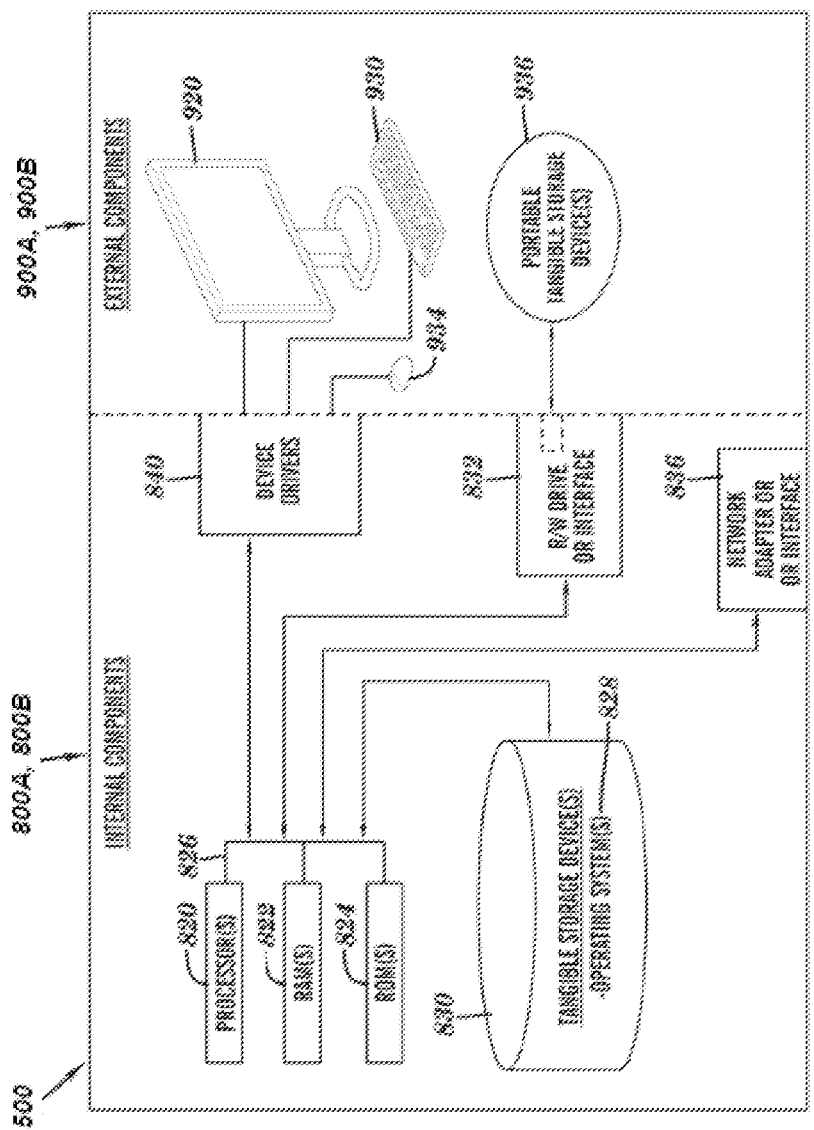
FIG. 10 is a block diagram of an example of computer code for video coding, according to some embodiments.

FIG. 10 is a block diagram 500 of internal and external components of computers depicted in FIG. 1 in accordance with an illustrative embodiment. It should be appreciated that FIG. 10 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 may be implemented in hardware, software, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Video Encoding Program 116 (FIG. 1) on server computer 114 (FIG. 1) may be stored on one or more of the respective computer-readable tangible storage devices 830 for execution by one or more of the respective processors 820 via one or more of the respective RAMs 822 (which typically include cache memory). In the embodiment illustrated in FIG. 10, each of the computer-readable tangible storage devices 830 may be a magnetic disk storage device of an internal hard drive. In some embodiments, each of the computer-readable tangible storage devices 830 may be a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B may also include a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Video Encoding Program 116 (FIG. 1) can be stored on one or more of the respective portable computer-readable tangible storage devices 936, read via the respective R/W drive or interface 832 and loaded into the respective hard drive, for example storage device 830.

Each set of internal components 800A,B may also include network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Video Encoding Program 116 (FIG. 1) on the server computer 114 (FIG. 1) may be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Video Encoding Program 116 on the server computer 114 may be loaded into the respective hard drive, for example storage device 830. The network may comprise copper wires, optical fibers, wireless transmission, routers, firewalls, switches, gateway computers and/or edge servers.

Each of the sets of external components 900A,B may include a computer display monitor 920, a keyboard 930, and a computer mouse 934. External components 900A,B may also include touch screens, virtual keyboards, touch pads, pointing devices, and other human interface devices. Each of the sets of internal components 800A,B may also include device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
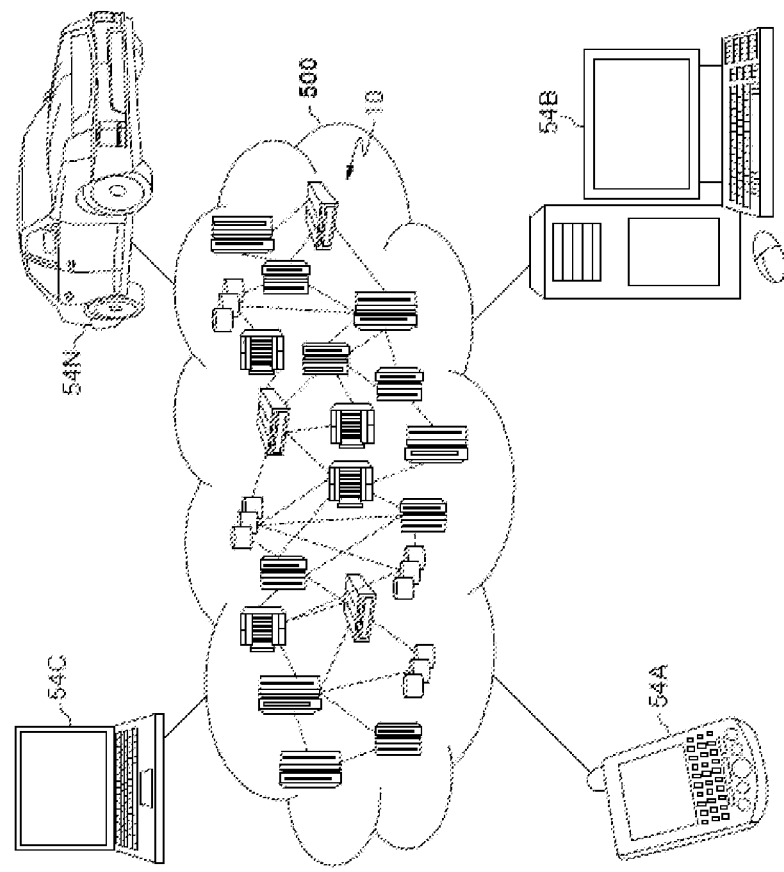
FIG. 11 is a block diagram of internal and external components of computers and servers depicted in FIG. 1 according to some embodiments.

Referring to FIG. 11, an illustrative cloud computing environment 600 is depicted which may be suitable for implementing certain embodiments of the disclosed subject matter. As shown, cloud computing environment 600 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 54A-N shown in FIG. 11 are intended to be illustrative only and that cloud computing nodes 10 and cloud computing environment 600 can communicate with any type of computerized device over any type of network and/or network addressable connection (e.g., using a web browser).

Figure 12:
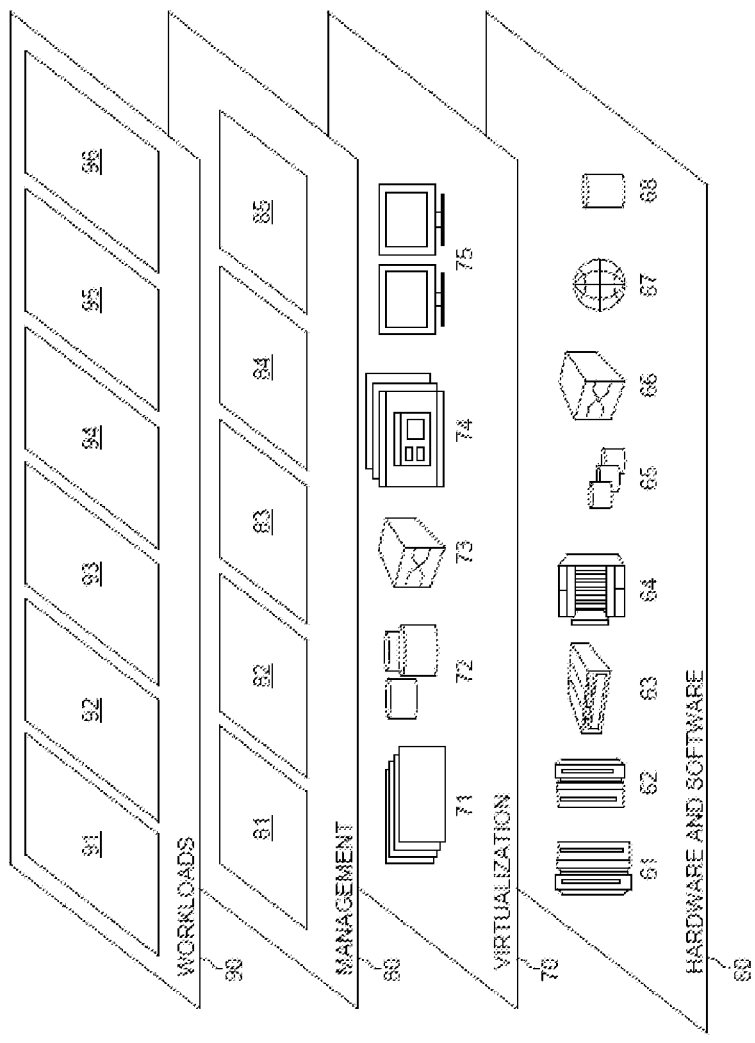
FIG. 12 is a block diagram of an illustrative cloud computing environment including the computer system depicted in FIG. 1, according to some embodiments.

Referring to FIG. 12, a set of functional abstraction layers 700 provided by cloud computing environment 600 (FIG. 11) is shown. It should be understood in advance that the components, layers, and functions shown in FIG. 12 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Video Encoding/Decoding 96. Video Encoding/Decoding 96 may encode/decode video data using delta angles derived from nominal angles.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 13:
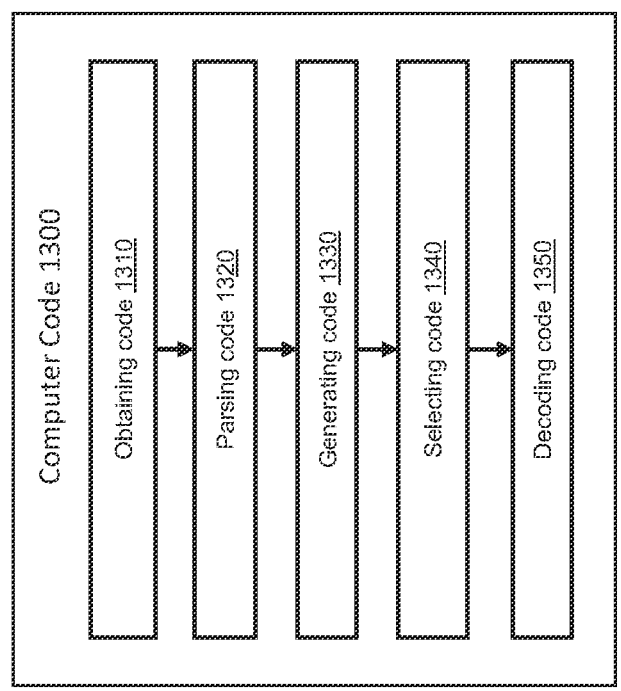
FIG. 13 is a block diagram of an example of computer code for video coding, according to embodiments.

FIG. 13 is a block diagram of an example of computer code 1300 for video coding, according to embodiments. In embodiment, the computer code may be, for example, program code or computer program code. According to embodiments of the present disclosure, an apparatus/device including at least one processor with memory storing computer program code may be provided. The computer program code may be configured to, when executed by the at least one processor, perform any number of aspects of the present disclosure.

As shown in FIG. 13, the computer code 1300 includes obtaining code 1310, parsing code 1320, generating code 1330, selecting code 1340, and decoding code 1350.

The obtaining code 1310 is configured to cause the at least one processor to obtain video data.

The parsing code 1320 is configured to cause the at least one processor to parse the obtained video data into blocks.

The generating code 1330 is configured to cause the at least one processor to generate a first warp model of a current block based on motion parameters of adjacent blocks, the motion parameters of the adjacent blocks including at least block position information, motion vector information, and delta values.

The selecting code 1340 is configured to cause the at least one processor to select a warp model from among the first warp model of the current block and a second warp model associated with one of the adjacent blocks as a base of a coding mode.

The decoding code 1350 is configured to cause at least one processor to decoding code configured to cause the at least one processor to decode the video data in the coding mode based on the selected warp model.

Although FIG. 13 shows example blocks of code, in some implementations, the apparatus/device may include additional blocks, fewer blocks, different blocks, or differently arranged blocks than those depicted in FIG. 13. Additionally, or alternatively, two or more of the blocks of the apparatus may be combined. In other words, while FIG. 13 shows distinct blocks of code, the various code instructions need not be distinct and could be intermingled.

Embodiments described herein may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. For example, the term block may be interpreted as a prediction block, a coding block, or a coding unit (i.e., CU).

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, performed by at least one processor, the method comprising:
    obtaining a coded video bitstream;
    obtaining a plurality of blocks from the coded video bitstream, wherein the plurality of blocks comprise a current block;
    in accordance with the current block being coded using a warp delta mode, deriving a delta warp model for the current block, including:
        checking a set of neighboring blocks in a pre-defined order, including, for each neighboring block in the set of neighboring blocks for the current block:
            when the neighboring block is coded in a warp mode, identifying respective warp parameters of the neighboring block; and
        deriving the delta warp model using one or more delta values and a base model, wherein the base model is based on warp parameters of one or more of the set of neighboring blocks, and wherein a range for the one or more delta values is based on the base model; and
    decoding the current block using the derived delta warp model.

2. The method according to claim 1, wherein deriving the delta warp model comprises selecting a first warp model from a set of warp models as the base model.

3. The method according to claim 1, wherein identifying the respective warp parameters comprises determining that a flag of the coded video bitstream indicates to select either a first warp model or a second warp model.

4. The method according to claim 1, wherein identifying the respective warp parameters comprises selecting a current block warp model as the base model instead of a global warp model.

5. The method according to claim 1, further comprising constructing a 2-parameter translational warp model using motion vector information associated with the current block, and selecting the 2-parameter translational warp model as the base model.

6. The method according to claim 1, wherein the respective warp parameters of the set of neighboring blocks are stored in a bank, and wherein using the warp parameters of one or more of the set of neighboring blocks comprises retrieving the warp parameters from the bank.

7. The method according to claim 1, wherein at least a subset of the respective warp parameters of the set of neighboring blocks comprise global warp parameters.

8. The method according to claim 1, wherein at least a subset of the respective warp parameters of the set of neighboring blocks comprise pre-defined warp parameters.

9. A method for video encoding, performed by at least one processor, the method comprising:
    obtaining video data comprising a plurality of blocks, including a current block;
    determining that the current block is to be coded using a warp delta mode;
    deriving a delta warp model for the current block, including:
        checking a set of neighboring blocks in a pre-defined order, including, for each neighboring block in the set of neighboring blocks for the current block:
            when the neighboring block is coded in a warp mode, identifying respective warp parameters of the neighboring block; and
        deriving the delta warp model using one or more delta values and a base model, wherein the base model is based on warp parameters of one or more of the set of neighboring blocks, and wherein a range for the one or more delta values is based on the base model; and
    encoding the current block using the derived delta warp model.

10. The method according to claim 9, wherein the respective warp parameters of the set of neighboring blocks are stored in a bank, and wherein using the warp parameters of one or more of the set of neighboring blocks comprises retrieving the warp parameters from the bank.

11. The method according to claim 9, wherein at least a subset of the respective warp parameters of the set of neighboring blocks comprise global warp parameters.

12. The method according to claim 9, wherein at least a subset of the respective warp parameters of the set of neighboring blocks comprise pre-defined warp parameters.

13. The method according to claim 9, wherein deriving the delta warp model comprises selecting a first warp model from a set of warp models as the base model.

14. The method according to claim 9, wherein identifying the respective warp parameters comprises determining whether to select either a first warp model or a second warp model.

15. A non-transitory computer-readable storage medium storing a video bitstream that is generated by a video encoding method, the video bitstream comprising:
    a plurality of encoded blocks, including a current block and one or more neighboring blocks,
    an indicator indicating that the current block is encoded using a warp delta mode; and
    an indication of one or more delta values for the current block; and
    wherein the video encoding method comprises deriving a delta warp model for the current block, including using the one or more delta values and a base model, wherein the base model is based on warp parameters of one or more neighboring blocks, and wherein a range for the one or more delta values is based on the base model.

16. The non-transitory computer-readable storage medium of claim 15, wherein the video bitstream further comprises a second indicator indicating whether to select a first warp model or a second warp model as the base model.

17. The non-transitory computer-readable storage medium of claim 15, wherein the warp parameters of one or more neighboring blocks are to be retrieved from a warp bank.

18. The non-transitory computer-readable storage medium of claim 15, wherein at least a subset of the warp parameters of one or more neighboring blocks are pre-defined warp parameters.

* * * * *